(No Model.) 3 Sheets—Sheet 1.

W. H. GARRETSON & S. B. TAINTER.
APPARATUS FOR BURNING GARBAGE, &c.

No. 503,845. Patented Aug. 22, 1893.

(No Model.) 3 Sheets—Sheet 2.

W. H. GARRETSON & S. B. TAINTER.
APPARATUS FOR BURNING GARBAGE, &c.

No. 503,845. Patented Aug. 22, 1893.

Witnesses
Percy C. Bowen
John C. Wilson

Inventors:
W. H. Garretson &
S. B. Tainter,
By Whitman & Wilkinson,
Attorneys.

(No Model.) 3 Sheets—Sheet 3.

W. H. GARRETSON & S. B. TAINTER.
APPARATUS FOR BURNING GARBAGE, &c.

No. 503,845. Patented Aug. 22, 1893.

Witnesses
Percy C. Bowen
John L. Wilson

Inventors:
W. H. Garretson &
S. B. Tainter,
By Whitman & Wilkinson,
Attorneys.

UNITED STATES PATENT OFFICE.

WILLIAM H. GARRETSON, OF DALLAS, AND SILAS B. TAINTER, OF GAINESVILLE, TEXAS.

APPARATUS FOR BURNING GARBAGE, &c.

SPECIFICATION forming part of Letters Patent No. 503,845, dated August 22, 1893.

Application filed May 15, 1893. Serial No. 474,291. (No model.)

*To all whom it may concern:*

Be it known that we, WILLIAM H. GARRETSON, residing at Dallas, in the county of Dallas, and SILAS B. TAINTER, residing at Gainesville, in the county of Cook, State of Texas, citizens of the United States, have invented certain new and useful Improvements in Apparatus for Burning Garbage and other Refuse; and we do hereby declare the following to be a full, clear, and exact description of the invention, such as will enable others skilled in the art to which it appertains to make and use the same.

Our invention relates to improvements in apparatus for burning garbage or other refuse products, and it consists of certain novel features hereinafter described and claimed.

Reference is had to the accompanying drawings, wherein the same parts are indicated by the same letters throughout the several views.

Figure 1:
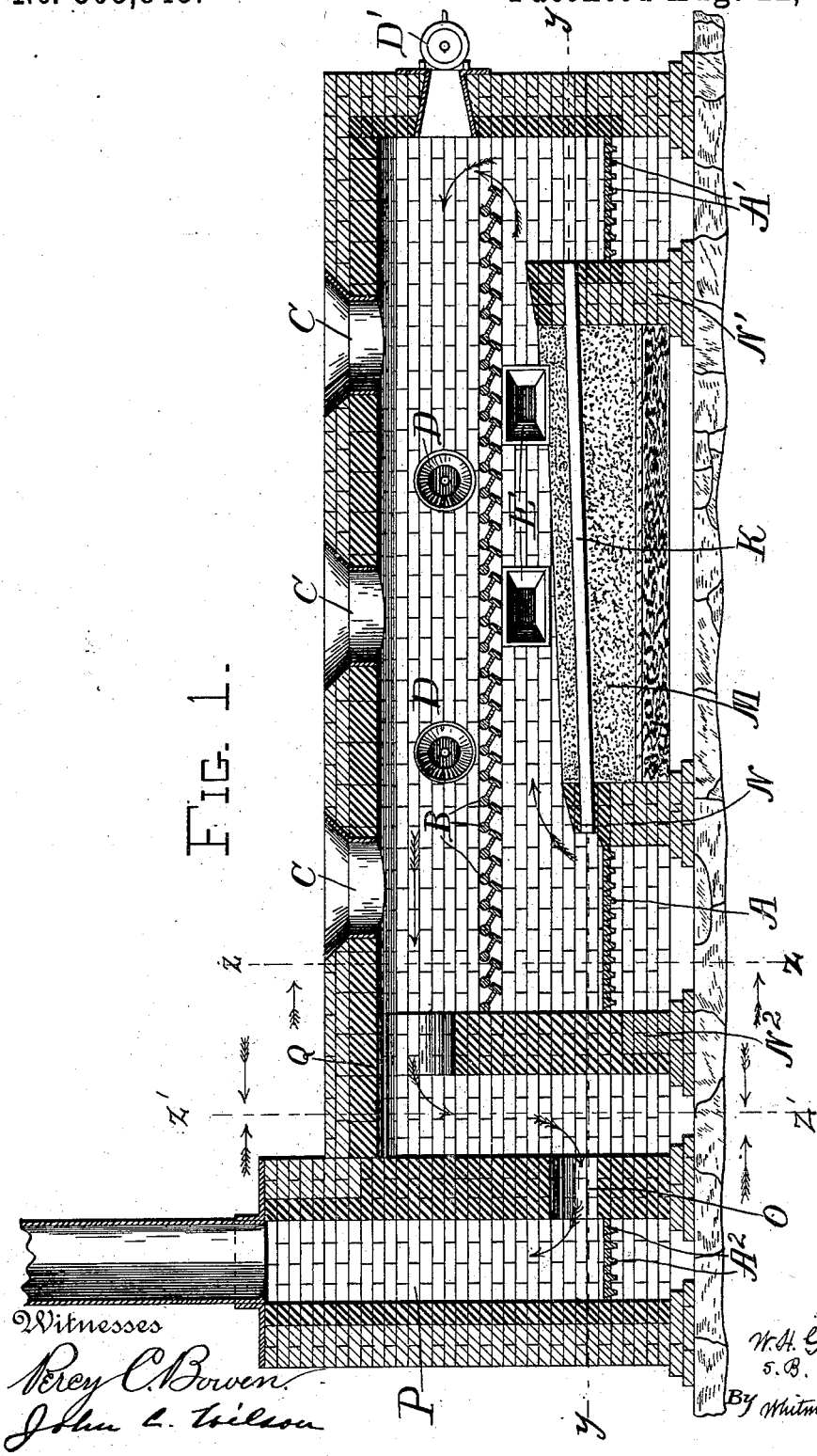
Figure 2:
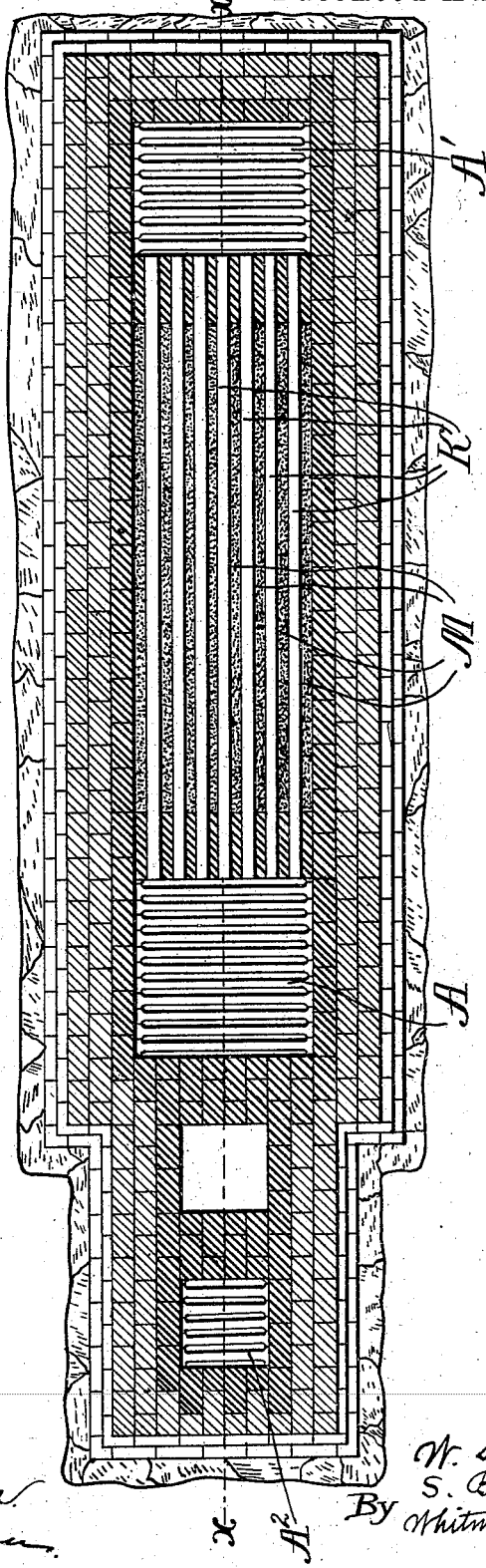
Figure 5:
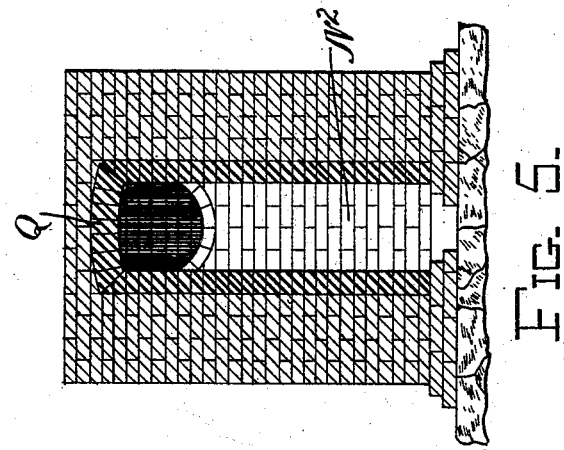
Figure 4:
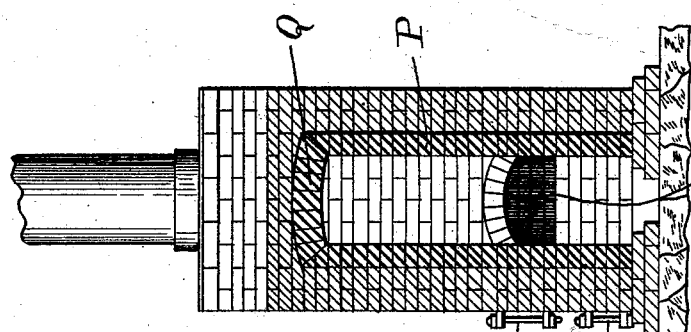
Figure 3:
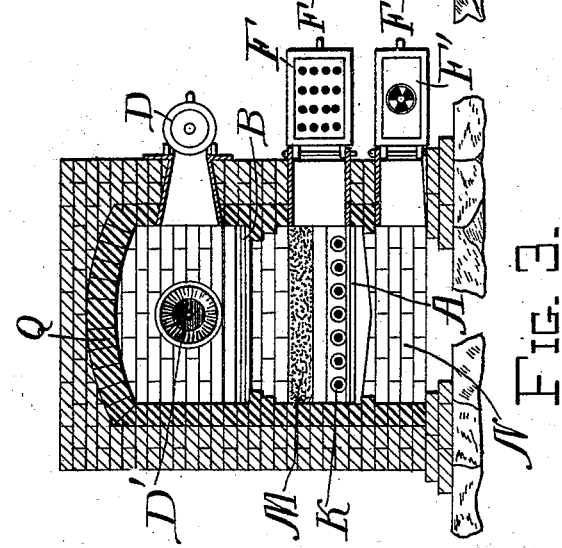

Figure 1 represents a vertical section of the apparatus along the line $x\ x$ of Fig. 2. Fig. 2 represents a horizontal section of the apparatus along the lines $y\ y$ of Fig. 1, and looking down. Fig. 3 represents a section along the line $z\ z$ of Fig. 1 and looking to the right. Fig. 4 represents a section along the line $z'\ z'$ of Fig. 1, looking to the left, and Fig. 5 represents the same section shown in Fig. 4, but looking to the right.

In order to show the various parts clearly, the burner has been represented as materially shorter in comparison with its height and breadth than would be the case in practice.

A represents a grate at one end of the roasting chamber, in which the garbage or refuse is roasted or burned.

A' represents a second grate at the rear end of the roasting chamber, which should preferably be smaller than the grate A, and $A^2$ represents a small grate at the base of the smokestack, or at any other part of the route of the offensive gases emanating from the garbage dumped on the grate B. The said grate B stops short of the end of the roasting chamber above the grate A'.

C represents one of a plurality of feeding hoppers, which are provided with tight covers, not shown, and through which the garbage or refuse may be spread upon the grate B.

D represents one of a plurality of doors or man-holes for moving the burned products from the top of the grate B, or for raking the same thereon; and D' is a similar door at the end of the furnace provided for a similar purpose.

E represents one of a plurality of doors situated beneath the grate B, and provided for the purpose of supplying and removing the mass M of absorbent material which receives the drippings from the grate B.

K represents a plurality of long hollow pipes opening above the grate A and A', and sloping upward as indicated in Fig. 1. Part of the heated products of combustion from the grate A is drawn upward by reason of the suction produced in the chamber A', assisted by the upward slope of the pipes, through these open pipes, and so heats and dries the mass of absorbent material M, into which the offensive liquid drippings from the grate B falls.

N, N', and $N^2$ indicate bridge or partition walls, over which the products of combustion must pass.

O represents an aperture in the side of the smokestack P for the influx of the gases from the garbage furnace, and Q indicates the arch-shaped top wall of the garbage furnace.

The operation of the device is as follows:—
The garbage is placed on the grate B through the hoppers C, which are hermetically closed. Just before the garbage is put in the main chamber, the fire is kindled on the grate $A^2$, in order to prevent the escape of any noxious fumes through the smoke stack. Most of the noxious fumes from decaying vegetable matter, consisting of hydrogen sulphide, ammonium sulphide and phosphides, are converted by the action of fire into odorless gases. After the garbage is in on the grate B, the fires on the grates A and A' are kindled and the process of burning or drying the refuse material is begun. The products of combustion from the grate A pass partly through the pipes K, heating the mass of material M, but pass mainly over the said material, along the bottom of the grate B, and up through the interstices wherever they may exist, in the mass of the refuse. After reaching the wall N' the partly cooled products of combustion from the grate A are reheated and at the same time supplemented by the fire on the grate A'; and the increased mass of heated gases passes the full length of the grate B, over the wall $N^2$, down through the opening O, and up through the smokestack. The fire on the grate $A^2$ not only tends to destroy the first noxious fumes that arise, but it also superinduces the draft through the apparatus, which is greatly to be desired, in starting fires quickly.

Should it be desired to keep the apparatus going continually, as will ordinarily be done, the fires are fed through the doors F, and the ash pits cleaned out through the doors F'; new material is fed through the hoppers C; and the solid residuum is removed through the doors D. Moreover, the garbage may be evenly distributed over the furnace by rakes or slice bars inserted through the doors D.

By means of this improved apparatus a great area of heating surface is obtained, and the products of combustion at a high temperature completely surround the mass of refuse material; while the mass of absorptive material is heated from within. This internal heating of the mass of absorbent material M, as by the pipes K, is most important, for otherwise the offensive fluids would settle in and soon clog up the absorbent material, evaporation taking place only from the upper surface, and that slowly owing to the well known poor conductivity of water. Thus if the mass of material M were not heated internally, and semi-fluid garbage were continually dropped on the grate B, the mass M would soon become saturated with moisture, and the fluid drippings would run over the bridge wall N, and into the fire on the grate A. But by having the heating pipes K some distance beneath the surface of the mass of absorbent material, convection currents would cause the fluids above the said pipes to evaporate rapidly and so keep the upper portion of the mass of material M at all times highly absorptive. It will also be seen that in the herein-described arrangement great accessibility of the parts is obtained. These, and the various other advantages of the herein-described construction, would readily suggest themselves to anyone skilled in the art.

Having thus described our invention, what we claim, and desire to secure by Letters Patent of the United States, is—

1. An apparatus for burning garbage, comprising a roasting chamber, a garbage grate B extending from one end of said roasting chamber nearly to the other end, grates A and A' beneath the two ends of said garbage grate, walls N and N' terminating below said garbage grate, a filling of absorbent material M between said walls, inclined pipes or flues opening above each of said grates A and A' embedded in said absorbent material, and sloping upward as shown, and means for carrying off the products of combustion after passing along the bottom and top of said grate B, substantially as and for the purposes described.

2. An apparatus for burning garbage, comprising a roasting chamber, a garbage grate B extending from one end of said roasting chamber nearly to the other end, grates A and A' beneath the two ends of said garbage grate, walls N and N' terminating below said garbage grate, a filling of absorbent material M between said walls, inclined pipes or flues opening above each of said grates A and A' embedded in said absorbent material, and sloping upward as shown, the wall $N^2$ partly closing one end of said chamber and leaving a passage above it for the products of combustion, the smoke stack P and the grate $A^2$ therein, substantially as and for the purpose described.

In testimony whereof we affix our signatures in presence of two witnesses.

WILLIAM H. GARRETSON.
SILAS B. TAINTER.

Witnesses to signature of William H. Garretson:
C. C. BUMPOS,
W. J. MORONEY.
Witnesses to signature of Silas B. Tainter:
BEN S. BROOKS,
W. D. ROWLAND.